
United States Patent [19]

Jahani

[11] Patent Number: 4,608,479
[45] Date of Patent: Aug. 26, 1986

[54] LEAD-FRAME SPLICER WELDER AND METHOD

[75] Inventor: Hooshang Jahani, Fremont, Calif.
[73] Assignee: National Semiconductor Corporation, Santa Clara, Calif.
[21] Appl. No.: 634,501
[22] Filed: Jul. 25, 1984
[51] Int. Cl.$^4$ .............................................. B23K 11/10
[52] U.S. Cl. ..................................... 219/87; 219/86.1; 156/504
[58] Field of Search ................. 219/86.1, 86.25, 86.33, 219/86.7, 87, 91.2, 155; 29/33 B; 156/157, 504

[56] References Cited

U.S. PATENT DOCUMENTS

| | | | |
|---|---|---|---|
| 2,196,600 | 4/1940 | Wean et al. | 29/33 B |
| 2,474,593 | 6/1949 | Putnam | 219/87 |
| 3,684,623 | 8/1972 | Koehler et al. | 156/504 |
| 4,490,199 | 12/1984 | Dunning | 156/504 |

Primary Examiner—Clarence L. Albritton
Assistant Examiner—C. M. Sigda
Attorney, Agent, or Firm—Gail W. Woodward; Paul J. Winters

[57] ABSTRACT

A splicer-welder (13) for multiple reels (11,12) of continuous tapes of multiple connected integrated circuit lead-frames to be conveyed through a lead-frame preparation line (10) includes fixed electrodes (40) positioned adjacent an entry slot (45) and spring-loaded movable electrodes (59) normally spaced from the fixed electrodes. The end of the lead-frame tape is sensed and by use of an accumulator section of multiple pulleys (18,19,20) one of which is movable on a rail (21), the span of tape between pulleys acts as a reserve of tape for continuous downstream processing of the tape while the end of the tape is stopped. Sprocket holes on the tape ends are placed on retaining pins (41,42) alongside the electrodes and one or more frames of a beginning of a second lead-frame tape from a second reel are overlapped with one or more frames of the end of the first tape. The electrodes are moved into welding position abuttive opposite sides of the overlapped ends of the tapes and the tapes spliced to each other at multiple weld spots. A translatable pin guard (43) permits free sliding passage of tape through the space between the electrodes in normal nonwelding operation and is retracted when splicing-welding is to be performed exposing the pins for receiving the ends of the tapes.

9 Claims, 5 Drawing Figures

U.S. Patent        Aug. 26, 1986        4,608,479
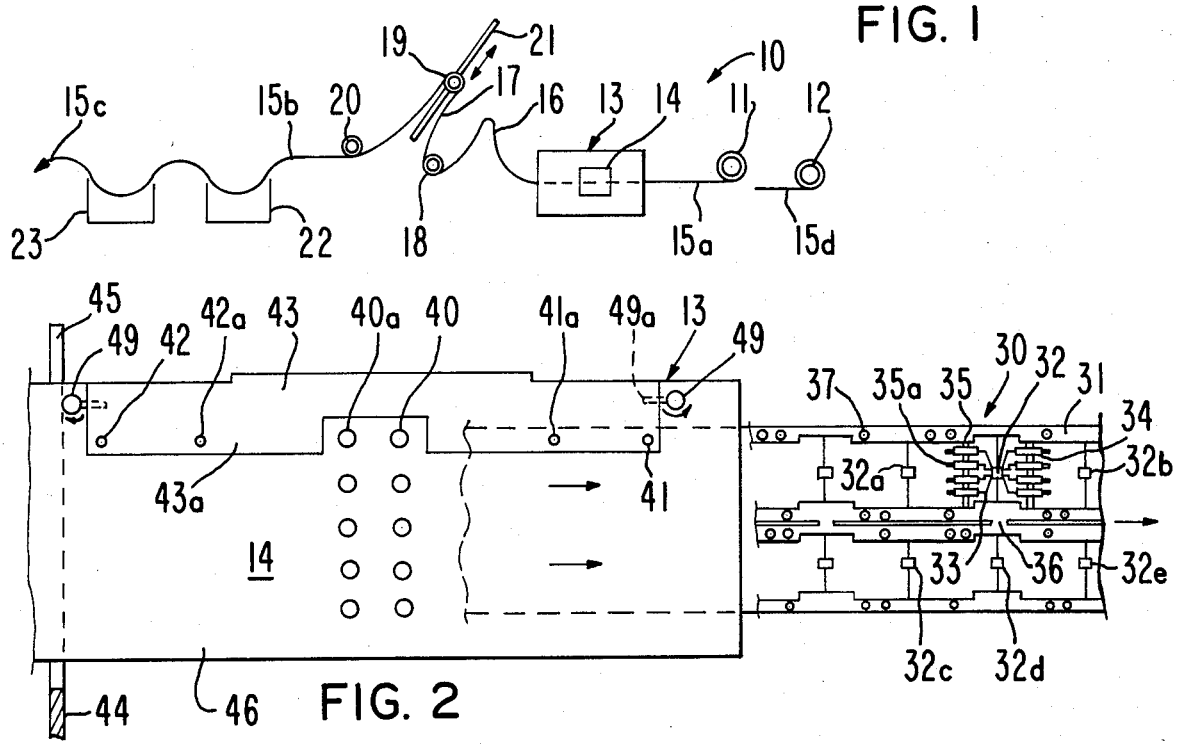
FIG. 1
FIG. 2
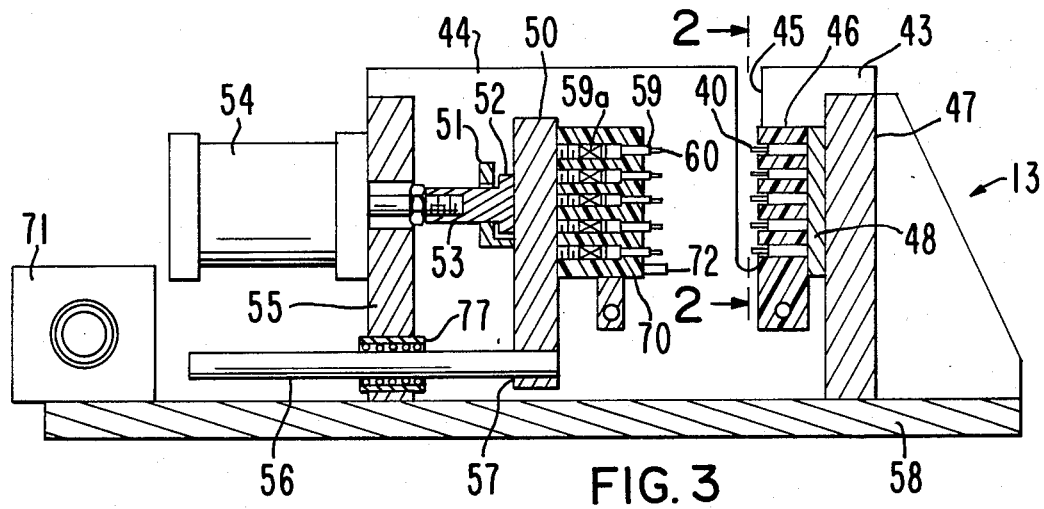
FIG. 3
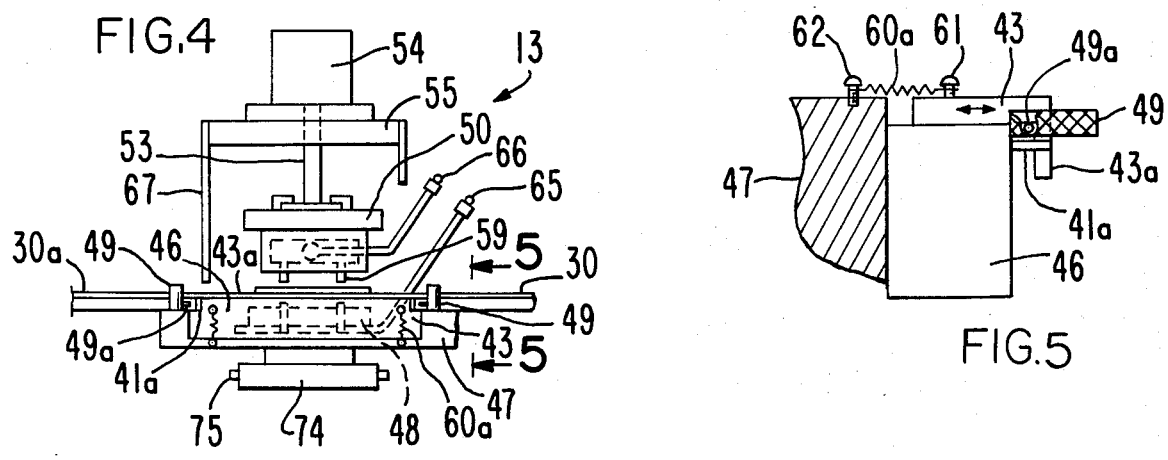
FIG. 4
FIG. 5

4,608,479

LEAD-FRAME SPLICER WELDER AND METHOD

BACKGROUND OF THE INVENTION

1. Field of the Invention

The invention relates to a lead-frame splicer welder and method which finds utility in the continuous production line manufacture of a component of integrated circuit packages. More particularly, the invention is part of the plating and other preparation of an extended tape of lead-frames.

2. Description of the Prior Art

For the continuous preparation of lead-frames to be plated, an extended tape of punched-out metal lead frames is supplied as a roll of tape on a circular reel. As one reel of tape is used up it is necessary, when continuous tape preparation operations are being performed, to quickly, accurately and efficiently connect a new reel of lead-frame tape to the end of the previous tape. Heretofore it has been found necessary to stop the production line preparing the lead-frame tape to join the end of a first-used tape to the beginning end of a second succeeding tape. If the tape is stopped within an etching or plating bath, contaminants may be deposited on the lead frames on a stretch of tape in a bath or the frames in the bath will be over-etched. Attempts have been made to splice "on the fly" by stapling, single spot welding or gluing the end of the first tape as it leaves the first feed reel to the beginning of the new tape on a second reel but it is difficult to assure proper alignment of the about finished tape end and a succeeding beginning of a new tape. If misalignment occurs, the new tape may not move smoothly through its finishing operations or be properly aligned with the downstream finishing stations. Further, if the staples are not accurately affixed in a proper position, they may snag in downstream fixtures or interfere with the separation of individual lead-frames from the tape in subsequent die packaging operations. To solve the time-to-staple problem, tape accumulators have been utilized but the stapling, welding or gluing operation has remained largely a manual operation, success being largely dependent on the attention and skill of the operator.

SUMMARY OF THE INVENTION

The present invention solves the above problems by providing a work station having a splicer-welder for splicing together the end of a first tape of lead-frames to a beginning end of a second succeeding tape of lead-frames A bank or set of multiple electrodes connected to a common high current (low voltage) source are in spaced alignment with a bank or set of commonly grounded electrodes while the tape is normally being payed-off its reel through the weld station to the lead-frame etching, plating or other chemical treatment bath. When a signal is received that the tape end is approaching, an automatic tape accumulator means is actuated which continues to feed tape to the treatment baths and the operator moves a tape holding pin guard by turning movement of a holding knob exposing pins adapted to accurately hold the last one, two or three frames of the stopped end of the first tape juxtaposed to the welding electrodes. The operator then insures that the first tape end is held on the pins and then overlaps the first one, two or three or additional frames of the second succeeding tape over the last one, two or three frames of the first tape on the pins and then actuates the automatic welding of multiple spots on the overlapping lead-frames. Ten spots are typically simultaneously made in about one-third of a second. As soon as the welds are completed, one of the electrode banks retracts, the operator pulls the pin guard out, locks it with a turning movement of the knob and the pins become recessed. The spliced tape is restarted in motion from the new feed reel and the accumulator is reversed so as to store tape for the next splicing cycle. Initial activation of the tape accumulator to continue to feed tape to the baths results in the operator having sufficient time for aligning the respective tapes on the pin structure and to actuate the welding operation. Since there may be 1000–2000 feet or more of lead-frame tape on a single reel, the ultimate loss of one, two or three overlapping frames representing ⅜"–⅝" of tape length is de minimus. The overlapping double thickness of lead-frames are subsequently sensed and removed. The old and new tapes are in perfect alignment with each other and downstream processing operations are not affected during subsequent movement of the weld joints and splice through downstream processing stations. The original tape continues at its normal velocity through the processing path while the splicing operation takes place due to the provided tape loop in the accumulator section.

BRIEF DESCRIPTION OF THE DRAWINGS

FIG. 1 is a simplified schematic of a lead-frame tape processing line in which the splicer-welder of the invention is used;

FIG. 2 is an interior vertical rear view of the fixed electrode bank and pin mechanism taken on the line 2—2 of FIG. 3;

FIG. 3 is a partial cross-sectional side view of the splicer-welder;

FIG. 4 is a partial top plan view of the splicer-welder; and

FIG. 5 is a partial detail of the pin mechanism taken on the line 5—5 of FIG. 4.

DETAILED DESCRIPTION

The overall lead-frame processing line 10 is seen in FIG. 1. Initially, an elongated tape 15a of interconnected lead frames are contained in roll form on a reel 11. Tape 15a is pulled by edge sprocket holes in the tape and a sprocket wheel (not shown), typically at a downstream portion 15c, through a splicer-weld station 13, a tape loop 16 and an accumulator section comprising fixed rotatable pulleys 18,20 and a movable rotatable pulley 19 which is movable along rail 21 to shorten or lengthen the span 17 between pulley 19 and pulleys 18,20. This permits tape at portion 15b to enter cleaning, etching, plating and other desired treatment baths 22,23 or other treatment stations at a constant speed so that the treatment time stays consistent even when a tape end is stopped at weld station 13. Suitable pulleys (not shown) guide the tape through the baths. The loop and accumulator allow for stoppage of the end of the tape at position 15a in the gap between the sets of welding electrodes for up to about one minute while the splice is being made by allowing accumulated tape in the loop and in the accumulator to proceed into the treatment baths. Normally the entire splice-weld operation takes only from about ten to twenty seconds. As the tape from reel 11 is expended, the accumulator is automatically actuated and the operator signalled so that he may actuate exposure of the pins by releasing the pin guard, so the pins can temporarily hold or align the first tape end in the weld station. He then overlaps one or more frames of tape end 15d from a new full reel 12 of additional lead-frame tape with one or more frames of the end of the tape from reel 11. End 15d is also mounted on the pins to ensure proper alignment. At that time, the welding mechanism is actuated by the operator and the overlapped frames joined together simultaneously at various spots along linear and vertical surfaces. An electric eye sensor may be juxtaposed to reel 11 (and reel 12 for the next cycle) which senses the presence of an opaque paper end on the first tape as it leaves the reel. This actuates the accumulator and a buzzer which alerts the operator to move the pin guard and to place the tape ends on the pins for the weld mode. In order to splice succeeding reels of tape a new reel is placed in the position occupied by reel 11 so that when reel 12 is emptied, a succeeding reel can be spliced to it in the manner described herein.

In FIG. 2, a lead-frame tape 30 is shown by the arrows exiting from the electrode area 14 of splicer-weld station 13. The metal lead-frame tape is of conventional flat copper band construction including lateral side edges 31 containing sprocket holes 37 and a grid of metallic fingers 34 interconnected by pathways 33 to a central interconnect pad 32. The fingers 34 are connected to edges 31 by break-away scored links 35 and to fingers of the next-in-line lead frame by links 35a. A double-row of tape is illustrated with lead frame side edges of the linear rows being interconnected by links 36. For simplicity, the fingers have been omitted from other central interconnect pads 32a, 32b, 32c, 32d and 32e which extend linearly in the connected rows of the lead-frames.

The tape 30 is passed through a slot 45 in the upstream sidewall 44 of the splicer-weld station adjacent reel 11. It normally passes along a linear vertical facing surface 43a of a right angular pin guard member 43. Knurled holding knobs 49, each having a fixed rightangle pin 49a extending outwardly, is rotatively held in a fixed insulative block or in plate 46 next to the pin guard. The right angle pins 49a project into the underside of guard 43 in a first position to hold guard 43 against return springs 60a (FIG. 5), outwardly and the pins recessed therebehind. Surface 43a normally extends beyond the tips of the pins so that tape 30 slides along surface 43a. Likewise surface 43a in this position extends beyond the tips of electrodes 40, 40a. In a commercial version the electrodes are aligned in two rows of five vertical fixed electrodes forming a first set or bank of electrodes. Upon actuation of the accumulator shortening the span between pulleys 19 and pulleys 18, 20 (FIG. 1) which results in effective stoppage of the free end of the last of the tape from reel 11 for a finite period of time, knobs 49 are rotated so pins 49a are rotated out from behind guard 43 allowing member 43 to be retracted by springs 60a (FIG. 5). Pins 41, 41a, 42, 42a are then fully exposed so that the sprocket holes 37 on the end of the first tape can be guided into registration on the pins by the operator. The sprocket holes on the first one or more frames from end 15d from new reel 12 are then overlapped with the last frame(s) of the first tape, each mounted on the pins. The overlapped tapes are then in position for the splicing/welding operation.

As shown in FIG. 3, electrodes 40 and adjacent electrodes 40a are fixedly connected to a common electrode holding conductive plate or bus bar 48. Each of the electrodes are insulated from one another by an apertured electrically insulating plate or electrode holder 46. Member 43 slides in and out on the top surfaces of plate 46 to expose the pins in retracted position and moves outwardly (toward electrodes 59) to a position beyond the tips of the pins 41, et al and electrodes 40, 40a to allow free movement of the tape through slot 45 to the downstream processing stations in the nonsplicing mode of operation. After retraction of member 43 and mounting of the lead-frame ends in overlapping position on the pins, as explained above, an actuator in the form of an air piston cylinder 54 is thereafter actuated by the operator which moves piston rod 53 outwardly moving movable inner plate or bus bar 50 and a second set or bank of electrodes 59 fixed thereto with moving rail 56 so that the tips 60, of electrodes 59 in unison contact one side of the overlapping tape frames and force the other side of the overlapping tape frames against the tips of electrodes 40, 40a. Rail 56 is press fitted in an aperture 57 in plate 50 and is mounted to slide in a linear bearing or slide means 77 fixed in an aperture in fixed plate 55 which plate is fixedly mounted on splicer-welder base 58. The respective banks of electrodes are aligned so that ten individual spot welds are simultaneously made. A reentrant slot 51 is provided on the rear of plate 50 to receive a T-shaped end piece 52 on piston rod 53.

Air piston cylinder 54 may be pneumatically controlled by a controller 71. Controller 71 may include a conventional air filter/pressure regulator, limit switches, operational switches for retracting member 43 and valving for moving piston rod 53. Preferably, the individual electrodes in electrode bank 59 are spring-mounted by springs 59a contained in apertures in insulative electrode mounting plate 70. This allows for a uniform welding force in the range of about 25 pounds on each set of aligned electrodes on either side of the overlapped lead-frames. For the shown ten sets of electrodes, the total force is 250 pounds. With uniform pressure there is uniform weld resistance and resulting uniform welds. Plate 50 acts as the bus bar for the electrode bank 59 and is connected to a high power 15 KVA power supply such as a Hughes WD 4477 power supply operable with 230 V.

Suitable fail-safe means (not shown) prevents operation of the electrodes without overlapped tape frames therebetween. Positive stops 72 are provided on one or both of the facing surfaces of plates 46 and 70 to prevent crushing of the overlapping lead frames. The double thickness of tape is about 0.02 inch, thus allowing adequate welding pressure between the aligned welding tips. The welding tips preferably are of a rounded conical configuration of approximately 2" radius. The electrodes are copper-copper or copper-Kovar Alloy 42. A top cover (not shown) with safety interlock, sidewalls and guards prevents operator ingress to the weld mechanism during normal nonsplicing mode and during welding. Sliding of the cover allows the operator access to overlap the tape ends on the pins.

FIG. 4 shows member 43 in nonretracted (out) position so that tape 30 rides across surface 43a. When retracted by operation of,the knobs and assisted by spaced retraction springs 60a extending between member 43 and plate 47, pins 41a and 42a, etc. as well as the tips of electrodes 40 are exposed to be contacted by the stopped tape 30. The bus bars 50 and 48 are connected to the power supply (not shown) by flexible 1" diameter No. 4/0 welding cables 65, 66 to reduce current losses and by heavy bus bars (not shown) of $\frac{3}{4}'' \times 1\frac{3}{4}''$ cross-section from the cable ends to the power transformer. Each of the electrodes are wire-soldered to its respective bus bar. Flexible cable 66 allows for movement of electrodes 59 toward electrodes 40. A safety guard 67 prevents operator access to the weld area. An operator control station 74 having push buttons 75 extending therefrom are used to reinitiate accumulator movement and tape accumulation, and the weld-splicing operation.

FIG. 5 illustrates the "out" position of member 43 with pin 41 being recessed behind surface 43a. When the knobs 49 are turned so that pin 49a no longer interferes with member 43, member 43 is retracted to the left, the tip of pin 41a is exposed so that the top sprocket holes of a tape may fit thereover for holding the two tape ends overlapped for the welding operation. The ends of springs 60a are held on members 43 and 47 by screws 61, 62.

The above description of the preferred embodiment of this invention is intended to be illustrative and not limiting. Other embodiments of this invention will be obvious to those skilled in the art in view of the above disclosure.

I claim:

1. A multiple spot welder comprising:
   a base;
   a slide means affixed to said base;
   a first set of multiple electrodes fixedly connected to a first common bus bar and fixedly connected with respect to said base;
   a second set of multiple electrodes fixedly connected to a second common bus bar;
   a translating plate mounting said second set of electrodes and slidable with respect to said slide means; and
   an actuator fixedly connected with respect to said base and including an actuator rod movable to move said translating plate along said slide means a distance sufficient to bring the second set of electrodes into aligned spaced juxtaposition with said first set of electrodes, each set of electrodes being in contact with opposite sides of a workpiece insertible in a gap between said sets of multiple electrodes.

2. The invention of claim 1 wherein said translating plate is connected to a slide rail translatably movable through said slide means.

3. The invention of claim 1 wherein said slide means comprises a linear bearing fixed in a vertical plate mounting said actuator.

4. The invention of claim 1 wherein said actuator rod has a T-head portion and said translatable plate includes a reentrant portion extending from a wall surface facing said actuator to capture said rod head portion so that motion of said rod moves said plate back and forth on said slide means into nonwelding and welding positions.

5. The invention of claim 1 further including means for allowing sliding movement of said workpiece in the gap between said electrode sets in nonwelding mode and means for stopping and aligning said workpiece with respect to said sets of electrodes prior to actuation of said translatable plate and flow of weld current through said electrodes and workpiece.

6. The invention of claim 5 in which said workpiece includes a series of sprocket holes and wherein said means for stopping and aligning said workpiece includes pin means insertable into at least one of said sprocket holes.

7. The invention of claim 6 including an insulative holder for said first set of electrodes; said pin means extending from a surface of said holder toward said gap; and a retractable guard member slidable on said holder to expose said pin means to said gap for allowing mounting of said sprocket holes of said workpiece on said pin means.

8. The invention of claim 6 wherein said workpiece is a lead-frame tape and said pin means has sufficient length for mounting overlapped ends of two workpiece tapes so that upon flow of weld current said tape ends are spliced together.

9. A lead-frame splicer-welder for multiple reels of lead-frame tape comprising:
   a first tape reel;
   a welding station including spaced sets of welding electrodes forming a gap therebetween;
   means for passing a first tape from said reel through said gap;
   means for temporarily stopping an end of said first tape adjacent said gap;
   means for mounting said first tape end in fixed position in said gap said means for mounting comprising pin means insertible into sprocket holes on said lead frame tape, a pin guard member translatable to variously expose and recess said pin means with respect to said gap and at least one rotative knob and attached pin for holding said member in a position recessing said pin means, said knob and attached pin being rotatable to release said guard member and allow retraction of said guard member to expose said pin means;
   a second tape reel including a first tape end;
   means for aligning and overlapping said second tape first tape end with the end of said first tape on said means for mounting said first tape;
   means for bringing said sets of electrodes into contact with said overlapping ends of said first and second tapes; and
   means to pass welding current through said sets of electrodes and said overlapping ends to splice said ends to one another.

* * * * *